United States Patent [19]
Lo et al.

[11] Patent Number: 5,717,844
[45] Date of Patent: Feb. 10, 1998

[54] METHOD AND APPARATUS FOR PRODUCING 3D PICTURES WITH EXTENDED ANGULAR COVERAGE

[76] Inventors: Allen Kwok Wah Lo, 5022 Hidden Branches Dr., Dunwoody, Ga. 30338; Kenneth Quochuy Lao, 650 Glen Ave., Westfield, N.J. 07090

[21] Appl. No.: 747,009

[22] Filed: Nov. 7, 1996

Related U.S. Application Data

[63] Continuation-in-part of Ser. No. 686,725, Jul. 11, 1996, which is a continuation-in-part of Ser. No. 588,134, Jan. 18, 1996, Ser. No. 349,481, Dec. 2, 1994, Pat. No. 5,625,435, and Ser. No. 333,201, Nov. 2, 1994, Pat. No. 5,583,971, which is a continuation-in-part of Ser. No. 1,025, Jan. 6, 1993, abandoned, said Ser. No. 349,481, is a continuation-in-part of Ser. No. 140,681, Oct. 21, 1993, abandoned.

[51] Int. Cl.$^6$ ................................................... G06K 15/00
[52] U.S. Cl. ................................................... 395/117; 395/105
[58] Field of Search ................................. 395/101, 102, 395/109, 112, 117, 119, 105, 125, 131; 353/6–8; 359/22–23, 458, 462–463; 250/558; 342/180; 396/324, 330; 348/42, 51; 346/134, 138 C; 352/57, 60–62, 239; 355/22; 347/134, 135, 136, 230–231

[56] References Cited

U.S. PATENT DOCUMENTS

| | | | |
|---|---|---|---|
| 5,412,449 | 5/1995 | Lam | 355/22 |
| 5,424,801 | 6/1995 | Lo et al. | 355/22 |
| 5,583,971 | 12/1996 | Lo | 395/117 |
| 5,625,435 | 4/1997 | Lo et al. | 355/22 |

*Primary Examiner*—Arthur G. Evans

[57] ABSTRACT

The printer for making 3D and animation pictures from a series of 2D images, according to the present invention, uses an electronic displaying device for sequentially displaying the 2D images. A projection lens is used to sequentially projecting the displayed 2D images, each at a different projection angle through a view-separating screen onto a photosensitive emulsion layer. The projection angles can be achieved or extended by tilting the emulsion layer together with the view-separating screen away from the image plane. Preferably, the electronic displaying means is also tipped to improve the focusing of the projection lens on the tilted image plane. In order to correct for the distortion in the projected image due to tilting and tipping, the 2D images are warped in accordance with the tilting and tipping angles prior to being displayed for exposure.

20 Claims, 12 Drawing Sheets

METHOD AND APPARATUS FOR PRODUCING 3D PICTURES WITH EXTENDED ANGULAR COVERAGE

The current application is a continuation-in-part of pending patent applications Ser. No. 08/686,725, filed Jul. 11, 1996, which is a continuation-in-part of the following applications: 1) Ser. No. 08/588,134, filed Jan. 18, 1996, 2) Ser. No. 08/349,481, now U.S. Pat. No. 5625435 filed Dec. 2, 1994, which is a continuation-in-part of Ser. No. 08/140,681, filed Oct. 21, 1993, now abandoned; and 3) Ser. No. 08/333,201, filed Nov. 2, 1994, now U.S. Pat. No. 5583971, which is a continuation-in-part of Ser. No. 08/001,025, filed Jan. 6, 1993, now abandoned.

FIELD OF THE INVENTION

The present invention relates to 3D photographic printers for making 3D and animation pictures on lenticular print material or barrier strip print material.

BACKGROUND OF THE INVENTION

In the making of a lenticular 3D or animation picture, the basic process involves the projection by a projection lens of a plurality of 2D images, each at a different projection angle, onto a lenticular print material to form a line-form composite image on the photosensitive emulsion layer underlying the lenticules. This projection printing method is well-known and has been disclosed in numerous patents. For example, U.S. Pat. No. 5,412,449 (LAM) discloses a single-stage printer for making 3D pictures from 2D images recorded on film. As disclosed in LAM, the projection angles are achieved by moving the projection lens and the print material to different locations relative to the exposing position of the 2D images—this is known as the scanning method in 3D photography. The scanning distance of the print material is generally limited by the image and field coverage angle of the projection lens and/or confined by the physical dimension of the printer. The limitation of the scanning distance, in turns, limits the total viewing angle of the lenticules on the lenticular prim material. Moreover, when making 3D pictures using 2D images recorded on film, the 3D printer must be equipped with high-precision optical and mechanical means for aligning the 2D images for exposure.

It is desirable to provide a method to make 3D picture wherein alignment of 2D images can be carried out electronically so as to simplify the printer design. It is also advantageous to provide a method to extend the total viewing angle of the lenticular material without improving the angular coverage of the projection lens or extending the scanning distance.

SUMMARY OF THE INVENTION

It is an objective of the present invention to provide a method and apparatus for printing 3D and animation pictures wherein the angular coverage of a projection lens is extended so as to enable the same lens to make pictures on print materials with a broader viewing angle.

It is another objective of the present invention to provide a method and apparatus to extend the angular coverage of a 3D/animation printer so that print materials with a broader viewing angle can be printed without extending the scanning distance.

It is a further objective of the present invention to provide a method and apparatus to make 3D and animation pictures wherein different projection angles can be achieved without moving the print material to different locations in relation with the projection lens.

It is yet another objective of the present invention to provide a method and apparatus to produce 3D and animation pictures with reduced image distortion on print materials with a broad viewing angle.

It is a further objective of the present invention to provide a method of producing 3D pictures from a plurality of 2D views wherein the alignment of 2D views can be accomplished electronically.

The above objectives can be achieved by 1) using an electronic image displaying device to sequentially display a series of 2D images for exposure and the 2D images are electronically shifted, if necessary, for alignment, 2) tilting the prim material away from the image plane of the projection lens to achieve a desired projection angle or to extend a projection angle, 3) tipping the image displaying device to correct the focusing of the projection lens on the tilted prim material, 4) electronically warping the 2D images, prior to displaying, according to the tilting angle and the tipping angle to correct for the image distortion due to the tilting and tipping.

The present invention provides a filmless method and printer for making 3D and animation pictures from at least two 2D images on a print material comprising an photosensitive emulsion layer secured to a view-separating screen which can be a lenticular screen or a parallax barrier plate. It is understood that a lenticular screen comprises a contiguous array of linear lenticules sharing a common longitudinal axis. Likewise, a parallax barrier plate comprises alternate linear blocking strips and clear strips having a common longitudinal axis. The printer uses an electronic displaying device to sequentially display the 2D images for exposure. The displayed 2D images are sequentially projected by a projection lens, each at a different projection angle, onto the print material. In order to change the projection angle, at least two of the elements comprising the projection lens, the displaying device and the print material are moved to different locations. At all times, the print material is located on the image plane while the displaying device is located on the object plane of the projection lens. The above-described filmless 3D printing method has been disclosed in patent application Ser. No. 08/333,201, filed Nov. 2, 1994, allowed May 15, 1996. To extend the projection angle of the printer, the print material can be tilted away from the image plane of the projection lens about an axis parallel to the longitudinal axis of the view-separating screen and the tilting is away from the optical axis of the projection lens. This tilting method has been disclosed in pending application Ser. No. 08/686,725, filed Jul. 11, 1996, of which the current application is a continuation-in-part.

Alternative to repositioning the projection lens and the print material relative to the image displaying means for changing the projection angle, one can use a fixedly positioned large-aperture lens to exposure a series of 2D images onto a fixedly positioned print material disposed on the image plane of the projection lens, each image through a different section of the lens aperture. This non-scanning approach has been disclosed in pending application Ser. No. 08/349,481, filed Dec. 2, 1994. In the non-scanning approach, the projection angle is limited by the effective aperture, or the f-Number of the projection lens, and the magnification factor. The projection angle can also be extended by tilting the print material away from the optical axis of the projection lens during the printing cycle. The tilting of print material in this non-scanning printer has also been disclosed in pending application Ser. No. 08/686,725, filed Jul. 11, 1996.

Furthermore, the projection angles at which the 2D images are projected onto the print material can be achieved solely by tilting the print material without using the above-described scanning and non-scanning methods. This approach has been disclosed in pending application Ser. No. 08/588,134, filed Jan. 18, 1996, of which the current application is also a continuation-in-part.

It should be noted that when the print material is tilted away from the image plane of the projection lens, the magnification factor is no longer uniform throughout the print material and the projected image is distorted as a function of the tilting angle. In order to reduce the distortion in projected image, the 2D images can be geometrically transformed, or warped, before they are displayed on the electronic displaying means. This method has been disclosed in pending application Ser. No. 08/686,725, filed Jul. 11, 1996, and pending application Ser. No. 08/588,134, filed Jan. 18, 1996.

It should be also noted that when the print material is tilted away from the image plane of the projection lens, the projected image on the print material may not be properly focused. However, the focusing can be improved by tipping the image display device can be tipped away from the object plane of the projection lens toward the optical axis of the projection lens, according to the present invention. As with the tilting of the print material, the tipping of the image displaying device also causes certain distortion in the projected image. Preferably, the warping of the displayed 2D images also takes into account the tipping of the image displaying device for correcting for the distortion in the displayed images.

The electronic image displaying device can be a CRT display, a monitor, an LCD panel, a LED panel, a plasma panel, a micro mirror chip or any matrix display device. The 2D images for exposing the print material can be views of a scene acquired at different viewing angles for making 3D pictures, or they can be views of different scenes or of the same object with time changes for making animation pictures.

The printing method, according to the present invention, can be applied to the making of 3D and animation on photosensitive emulsion layer underlying a view-separating screen. The emulsion layer can be directly coated on the view-separating screen or securely attached to the view-separating screen during printing. Furthermore, it is desirable to include a chemical processor to the filmless printers as disclosed so that the processing of 3D and animation pictures so produced is part of an in-line process.

The present invention has been described in preferred forms wherein only one projection lens is used to sequentially project a series of 2D images which are sequentially displayed on only one image displaying device. It should be noted that the same principle can be applied to a projection system wherein more than one image displaying device is used for displaying, and more than one projection lens is used for image projection.

The objectives and scope of the present invention will become apparent upon reading the detailed description of the invention.

DETAILED DESCRIPTION OF THE INVENTION

Figure 1:
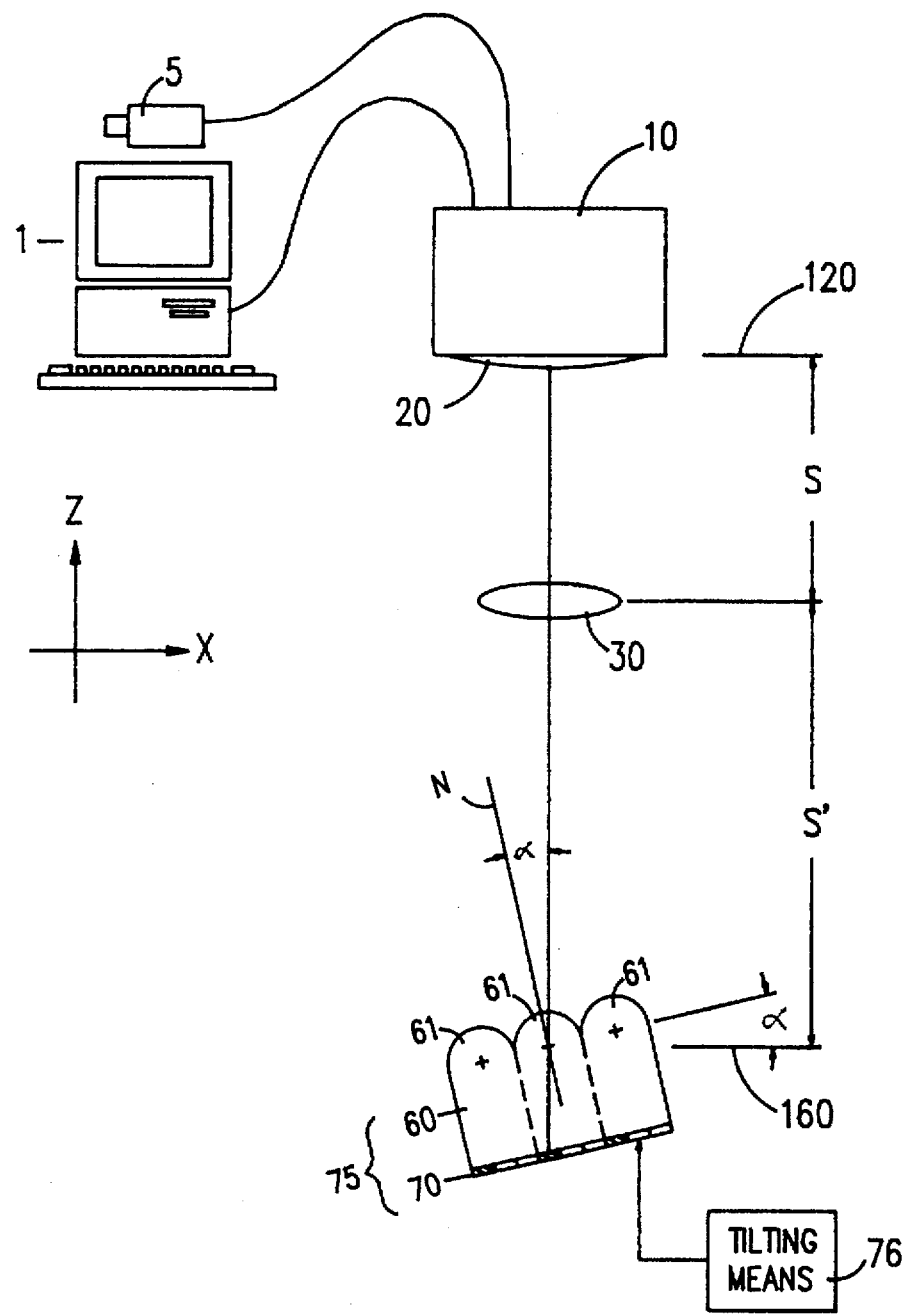
FIG. 1 illustrates the tilting of the print material away from the image plane of the projection lens to achieve an oblique projection angle.

FIG. 1 illustrates the tilting of the print material to achieve an oblique projection angle, as disclosed in pending application Ser. No. 08/588,134, filed Jan. 18, 1996, of which the current application is also a continuation-in-part. In FIG.1, numeral 10 denotes an electronic displaying means for sequentially displaying a series of 2D views for exposure and numeral 20 denotes one of the displayed 2D views. The 2D images are sequentially projected by a projection lens 30 onto a lenticular print material 75, each image at a different projection angle. As shown in FIG. 1, the projection angle α is achieved solely by tilting the print material 75 away from the image plane 160 by tilting means 76 by an angle a about an axis parallel to Y axis which is perpendicular to both the Z and X axes. Preferably, an electronic image displaying device 10 receives 2D images from an electronic storage means such as a computer workstation 1 or an electronic camera 5. The prim material 75 comprises a lenticular screen 60 having lenticules 61 and an underlying photosensitive emulsion layer 70. The lenticules 61 has a common longitudinal axis parallel to the Y axis. For illustrative purposes only, the picture is composed from only three 2D images. Thus, the image area on the emulsion layer 70 underlying each lenticule 61 is divided into three linear sections to be filled with line-form images compressed from three 2D images projected at three projection angles. As shown, the shaded, leftmost image areas are filled with the compressed image of 2D view 20 at a projection angle α. In FIG. 1, the object plane and the image plane of the projection lens is denoted by numeral 120 and numeral 160. The surface normal of the lenticular screen is denoted by letter N.

Figure 2:
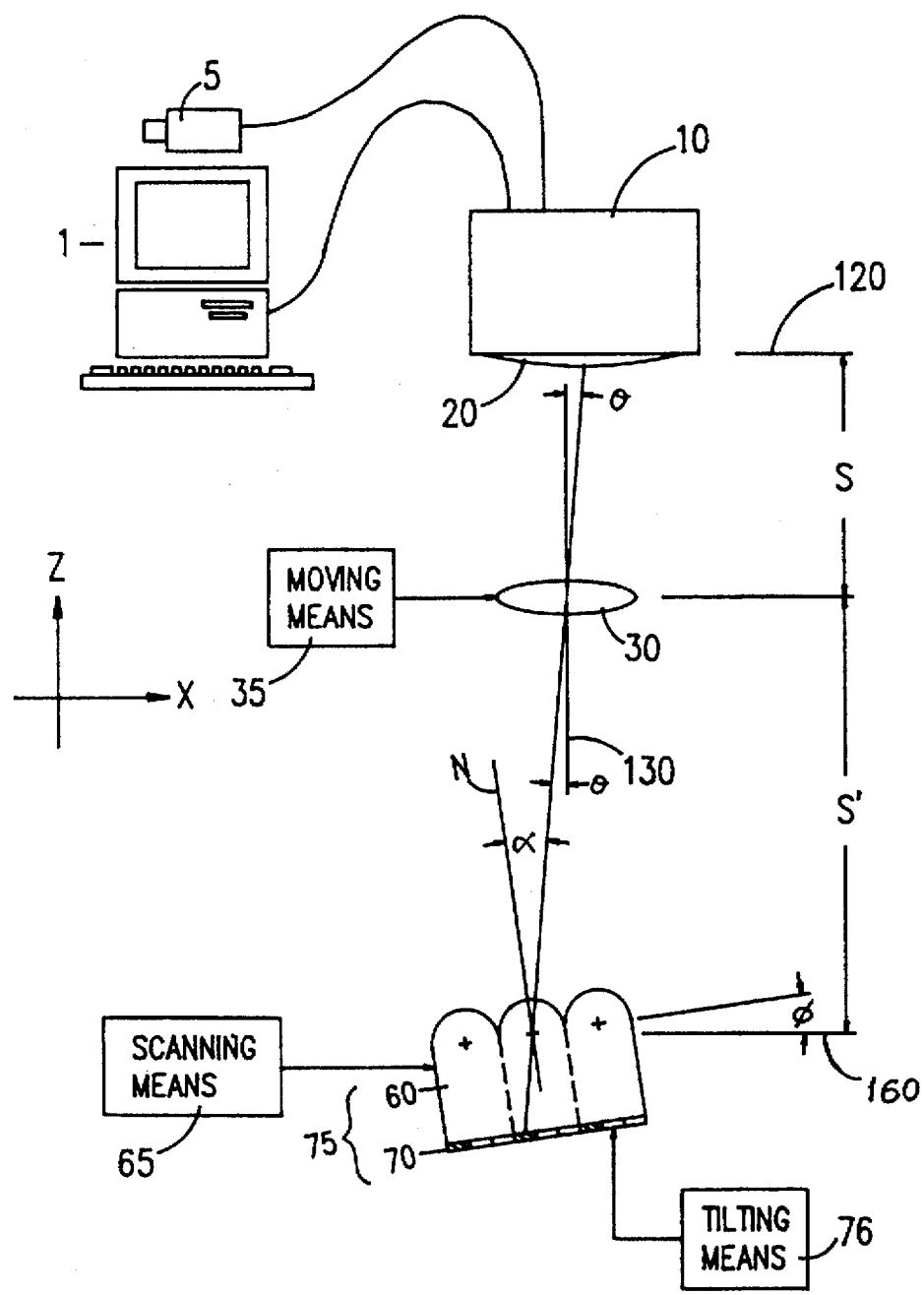
FIG. 2 illustrates the tilting of the print material away from the image plane of the projection lens to increase the projection angle in a scanning printer.

FIG.2 illustrates the tilting of the print material to increase the oblique projection angle in a filmless scanning printer, as disclosed in pending application Ser. No. 08/686,725, filed Jul. 11, 1996. As shown in FIG.2, the projection angle is achieved by combining a scanning angle and a tilting angle. The prim material 75 and the projection lens 30 are moved, respectively, by moving scanning means 65 and moving means 35 to different locations in relation to the image displaying device 10 to achieve different scanning angles Θ. In addition, the print material 75 is tilted by tilting means 76 away from the optical axis 130 of the projection lens 30 and away from the image plane 160 by an angle φ, resulting in a projection angle α=Θ+φ. It is understood that the scanning angle Θ can be obtained by moving any two of the three components including the projection lens, the print material and the image displaying device. With the combination of tilting and scanning, the projection angle can be extended far beyond the field coverage of the projection lens 30 and the scanning distance of the print material 75 relative to the displaying means 10 can be reduced.

Figure 3:
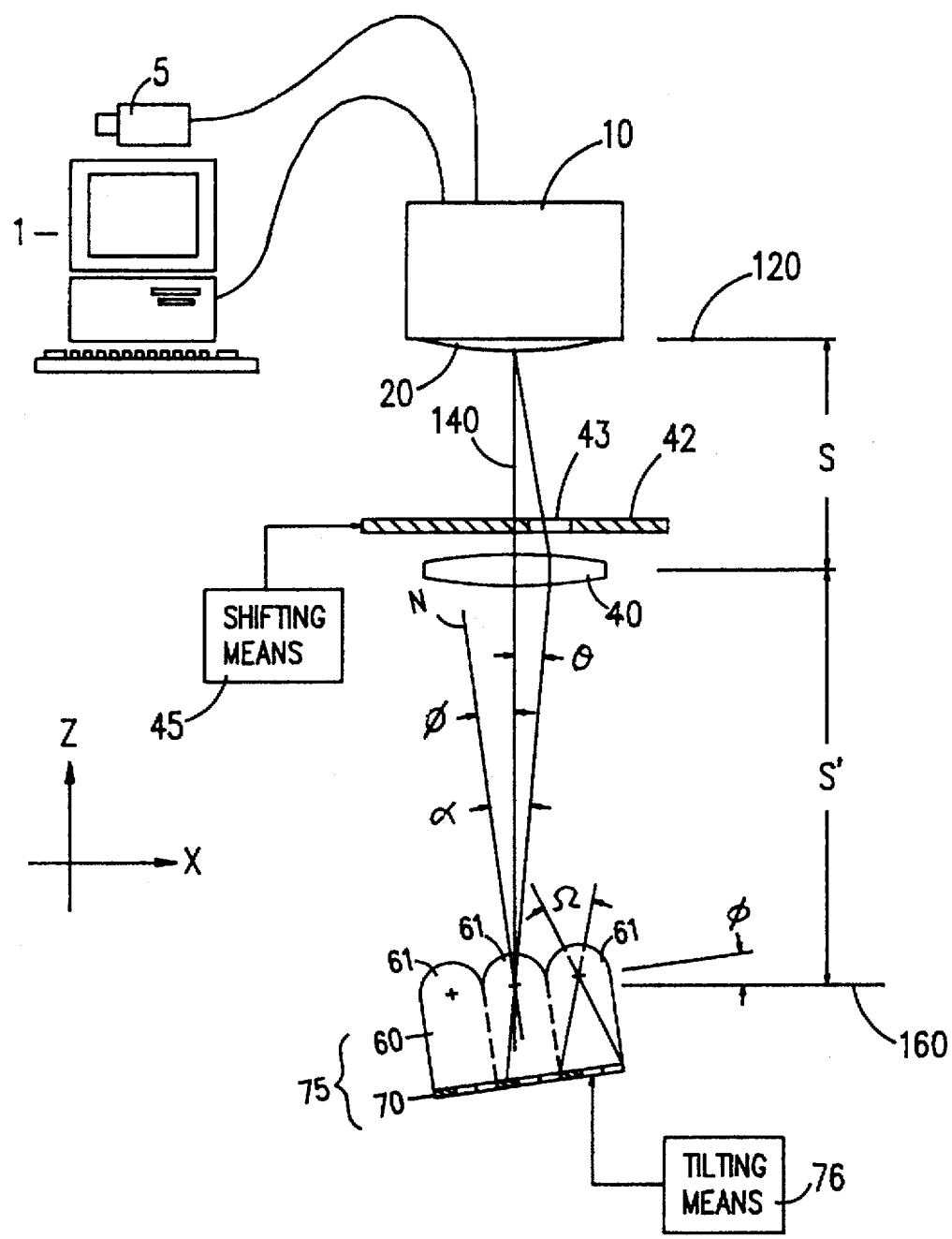
FIG. 3 illustrates the tilting of the print material away from the image plane of the projection lens to increase the projection angle in a non-scanning printer.

FIG.3 illustrates the tilting of the print material to increase the oblique projection angle in a non-scanning printer, as disclosed in pending application Ser. No. 08/686,725, filed Jul. 11, 1996. In the non-scanning printer illustrated in FIG.3, a fixedly-positioned large-aperture lens 40 is used to sequentially project a series of 2D images which are sequentially displayed on an electronic displaying device 10. An aperture plate 42 having an opening 43 is moved along the X axis by shifting means 45 to control the projection path through different sections of the aperture of the projection lens 40. As shown, a 2D image 20 is projected through the rightmost aperture section of the projection lens at angle Θ, relative to the optical axis 140 of the projection lens 40. In additional, the print material 75 is also tilted by tilting means 76 by an angle φ away from the image plane 160 and away from the optical axis 140. The combined projection angle is a α=Θ+φ. With the tilting of the print material, the projection angle onto the print material can be extended beyond the field coverage of the projection lens. Thus, a print material with a broader viewing angle Ω can be used for printing.

Figure 4:
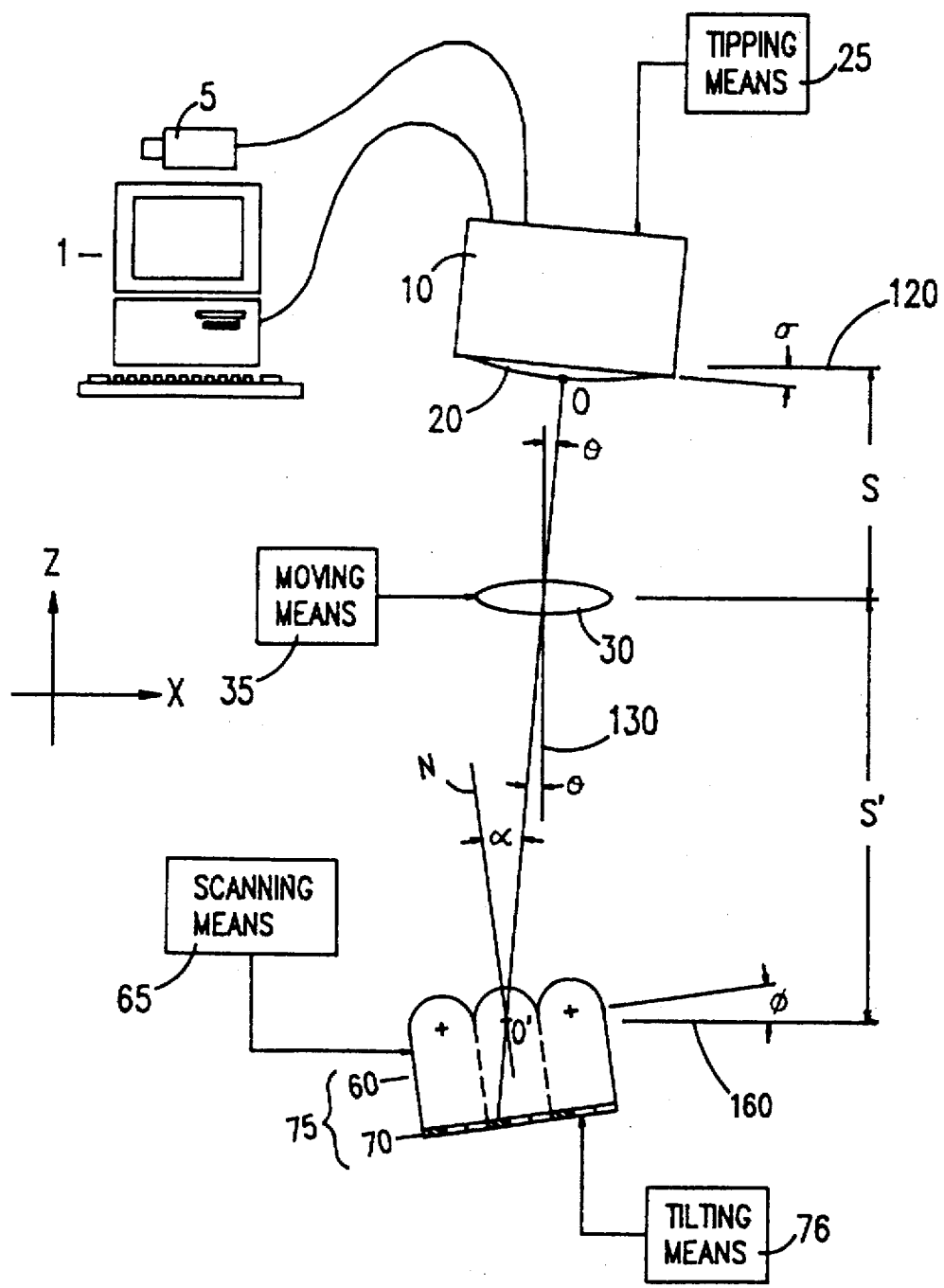
FIG. 4 illustrates the tipping of the image displaying device to improve the focusing of the projection lens onto a tilted print material.

FIG.4 illustrates the tipping of the image displaying means to improve the focusing of the projection lens onto a tilted print material, according to the present invention. When the print material 75 is tilted away from the image plane 160 of the projection lens 30, the projected image on the print material may not be properly focused throughout the print material 75. In order to improve the focusing on the projected image on the print material 75 which is tilted by angle φ, the image displaying device 10 is tipped by tipping means 25 away from the object plane 120 by an angle σ. The proper tipping angle is given by the magnification factor M=(S'/S), or $$\sigma = -(i\ S/S')\phi = -\phi/M$$

where S and S' are, respectively, the object distance and the image distance of the projection lens 30. It should be noted that the tipping of displaying device 10 for improving the focusing of the projection lens, according to the present invention, can also be applied to the filmless, non-scanning printing as depicted in FIG. 1 and FIG. 3.

Figure 5:
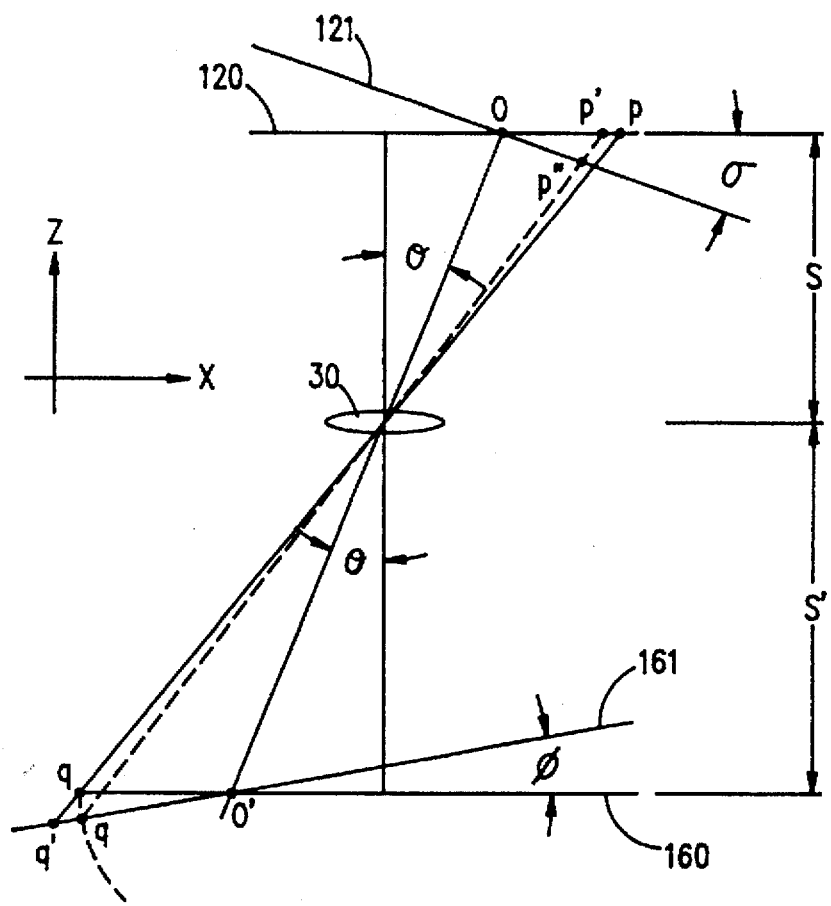
FIG. 5 illustrates the distortion on the projection image due to the tilting of the print material and the tipping of the 2D image in a scanning printer.

FIG.5 illustrates the distortion in the projected image due to the tilting of the print material and the tipping of the displayed 2D images in a scanning printer. FIG.5 depicts the situation when a 2D image, originally located on the image plane 120 of the projection lens 30, is projected off-axis at an angle Θ onto the image plane 160 which is perpendicular to the Z axes. An image point p on the object plane 120 produces a point q on the image plane 160. As the print material is tilted away from the image plane 160 by an angle φ and located on a tilted plane 161, the same point p produces a point q' on the tilted plane 161, resulting in the distortion of the projected image. In order to correct for the distortion due to tilting, point p on the object plane 120 must move to p' so that the image point will again appear at q on the tilted plane 161. Furthermore, when the 2D image is tipped by an angle o to correct the focusing of the projection lens 30, the point p on the 2D image must be further moved to point p" to correct for the distortion due to the tipping. In FIG. 5 letter o and o' denote the center of displayed 2D image and the center of the projected image, respectively. If (x,y), (x', y') and (x", y") are, respectively, the coordinate of point p, point p' and point p" on the 2D image, it can be shown that:

$$x'=x(\cos\phi-\sin\phi\tan\Theta)/\{1+(1(x/S)\sin\phi\}$$

$$y'=y/\{1+(x/S)\sin\phi\}$$

$$x''=x'/\{\cos\sigma+(\sin\sigma/S)(x'+S\tan\Theta)\}$$

$$y''=y'/\{1-(x''/S)\sin\sigma\}$$

In the above equation, σ=φ(S/S').

In summary, when a 2D image is projected onto the print material located at a tilted position by an angle α, it is preferred that the 2D image is warped, or geometrically transformed, to correct for the image distortion in accordance with the above equations. The warping is such that an image point (x,y) on the 2D image is moved to a point (x', y') for tilting alone, where $$x'=x(\cos\phi-\sin\phi\tan\Theta)/\{1+(x/S)\sin\phi\}$$

$$y'=y/\{1+(x/S)\sin\phi\}$$

If the 2D image is also tipped by an angle σ to improve the focusing, then an image point (x,y) should be moved to point (x", y"), where $$x''=x'/\{\cos\sigma+(\sin\sigma/S)(x'+S\tan\Theta)\}$$

$$y''=y'/\{1+(x''/S)\sin\sigma\}$$

Figure 6:
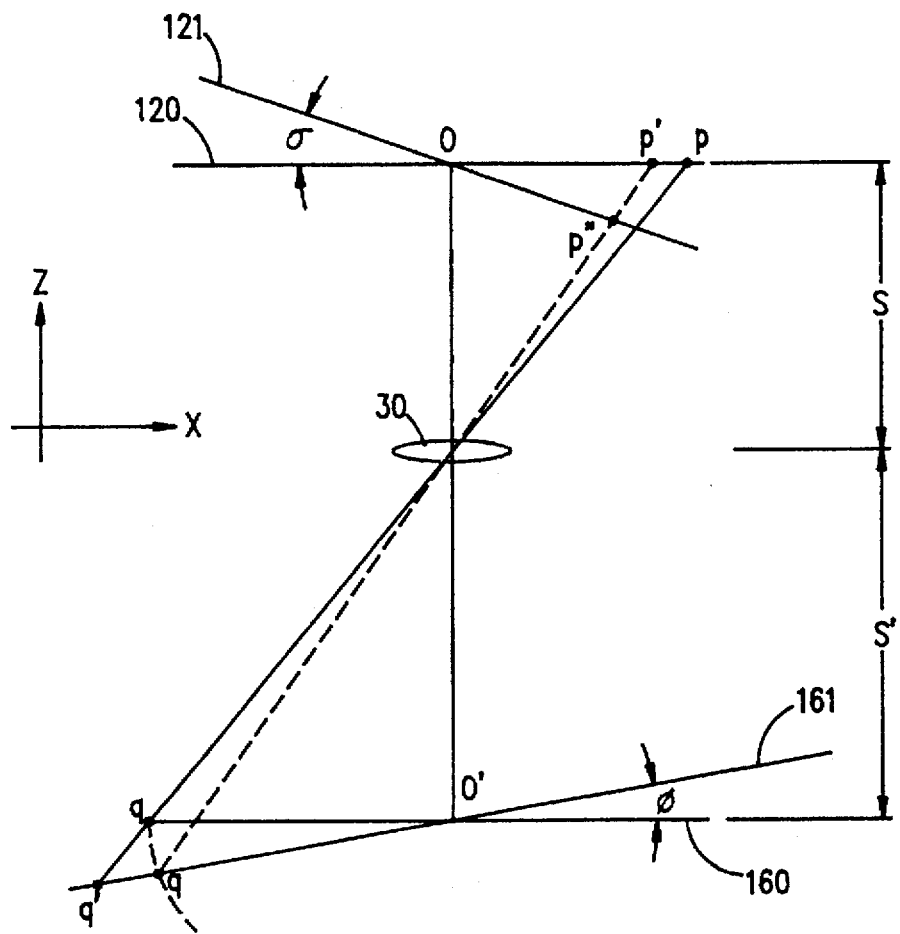
FIG. 6 illustrates the distortion on the projected image due to the tilting of the print material and the tipping of the 2D image in a non-scanning printer.

FIG. 6 illustrates the distortion on the projection image due to the tilting of the print material in a non-scanning printer. FIG. 6 depicts the situation when a 2D image, originally located on the image plane 120 of the projection lens 30, is projected on-axis on the image plane 160 which is perpendicular to the Z axes. An image point p on the object plane 120 produces a point q on the image plane 160. As the print material is tilted away, from the image plane 160 by an angle φ, to be located on a tilted plane 161, the same image point p produces a point q' on the tilted plane 161, resulting in the distortion of the projected image. In order to correct for the distortion due to tilting, point p on the object plane 120 must move to p' so that the image point will again appear at q on the tilted plane 161. Furthermore, when the 2D image is tipped by an angle σ to improve the focusing, the point p on the 2D image must be further moved to point p" to correct for the distortion due to tipping. If (x,y), (x', y') and (x", y") are, respectively, the coordinate of point p, point p' and point p" on the 2D image, it can be shown that:

$$x'=x\cos\sigma/\{1+(x/S)\sin\phi\}$$

$$y'=y\{(1+(x/S)\sin\phi\}$$

$$x''=x'/\{\cos\sigma+(x'/S)\sin\sigma\}$$

$$y''=y'/\{1-(x''/S)\sin\sigma\}$$

In the above equation, σ=φ(S/S').

Figure 7:
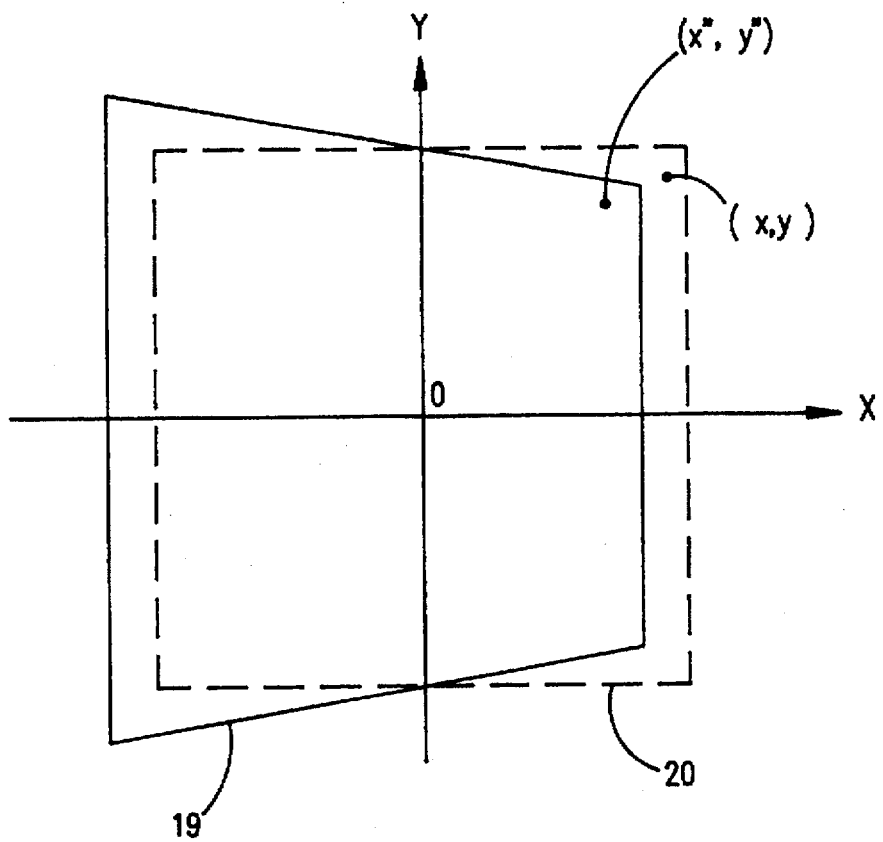
FIG. 7 illustrates the typical shape of a warped displayed image for correcting for the image distortion due to the tilting of the print material and/or the tipping of the displayed image.

FIG. 7 illustrates the typical shape of a warped displayed image for correcting for the image distortion due to the tilting of the print material and/or the tipping of the displayed image. As shown in FIG. 7, numeral 19 denotes the typical shape of a warped 2D image, geometrically transformed from a regular 2D image 20, in accordance with the equations in the detailed description of FIG. 5 or FIG. 6 for correcting for the distortion of the projected image on a tilted image plane from a tipped object plane as depicted in the two figures. Here (x,y), (x", y") denote, the coordinate of an image point on the original 2D image and the warped 2D image, respectively.

Figure 8A:
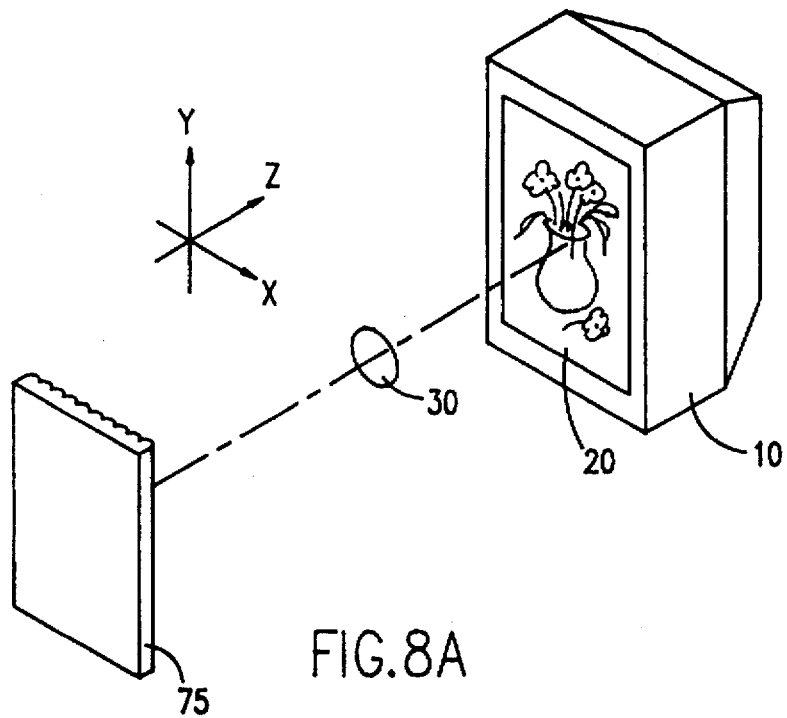
FIG. 8 illustrates the orientation of the displayed 2D images in relation to the lenticules on a lenticular screen.
Figure 8B:
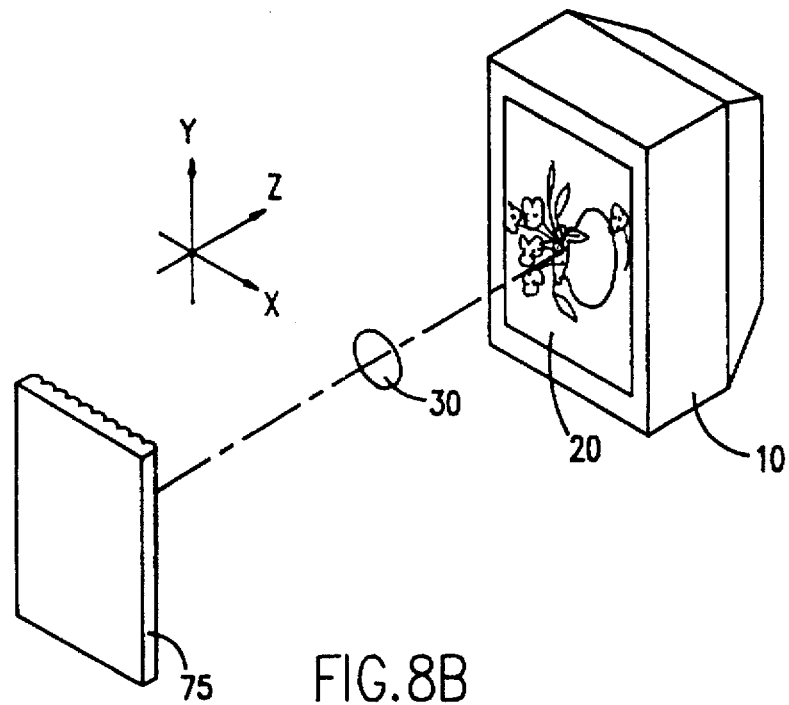

FIG. 8 illustrates the orientation of the displayed 2D images in relation to the lenticules on a lenticular screen. As shown in FIG. 8A, the upright direction of the displayed 2D image 20 on the displaying device 10 is parallel to the Y axis and the longitudinal axis of the lenticules on the print material 75. This orientation of the displayed image is usually used for making 3D pictures, but it can also be used for making animation pictures. In FIG. 8B, the upright direction of the displayed 2D image 20 on the displaying device 10 is parallel to the X axis and is perpendicular to the longitudinal axis of the lenticules on the print material 75. This orientation is usually used only for making animation pictures.

Figure 9:
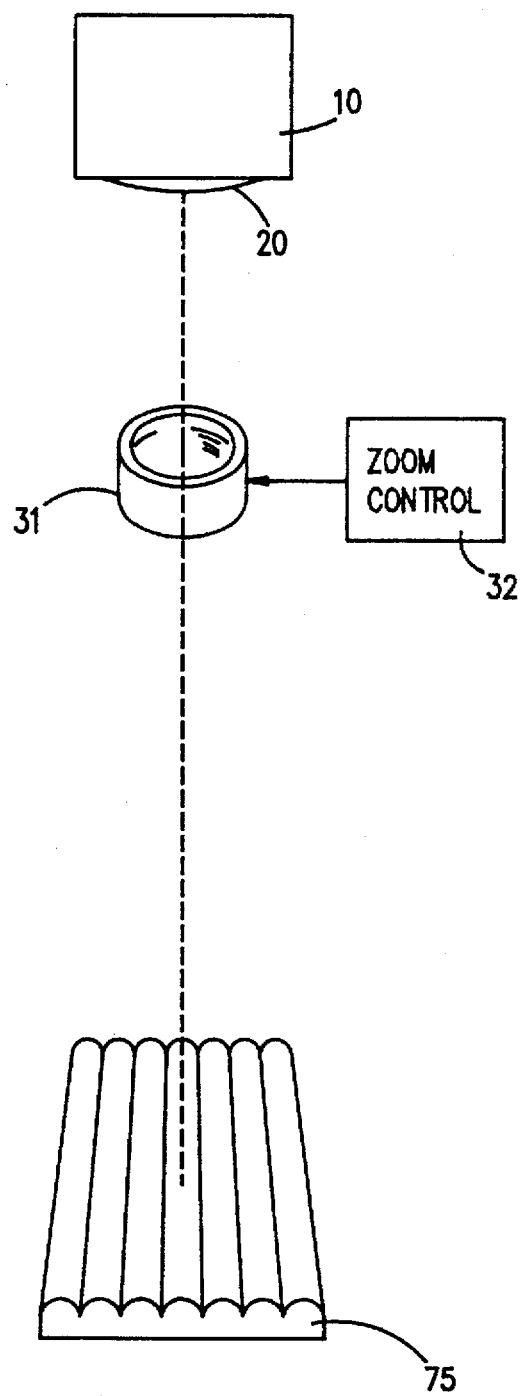
FIG. 9 illustrates the use of a zoom lens in a filmless printer for making pictures of different magnifications.

FIG. 9 illustrates the use of a zoom lens in a filmless printer for making pictures of different magnifications. As shown in FIG. 9, a zoom lens 31 along with a zoom control means 32 is used in a filmless printer, according to the present invention, to make 3D and animation pictures of different print sizes, on lenticular print material 75.

Figure 10:
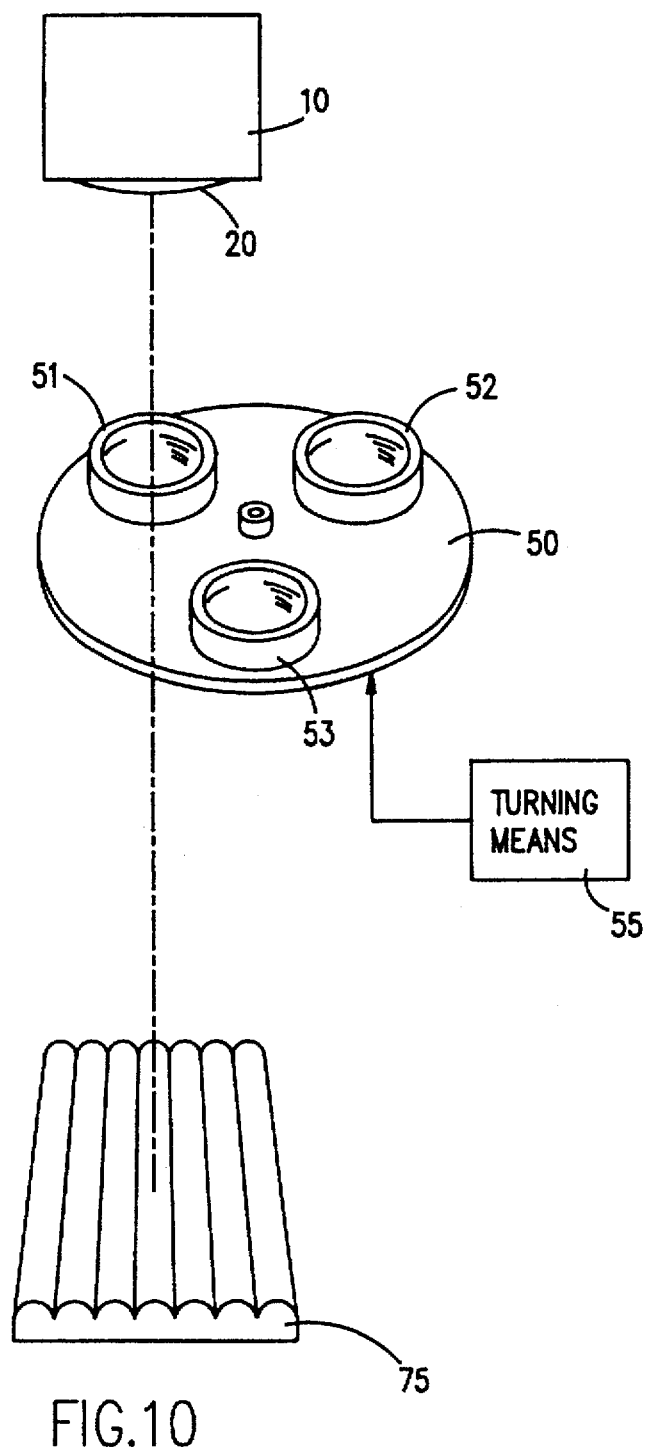
FIG. 10 illustrates the use of a plurality of projection lenses in a filmless printer for making picture with different magnification.

FIG. 10 illustrates the use of a plurality of projection lenses in a filmless printer, according to present invention, for making pictures with different magnifications. As shown in FIG. 10, a turret 50 containing a plurality of projection lenses 51, 52, 53 of different focal lengths for making 3D and animation pictures of different sizes, on print material 75. Turning means 55 is used to turn the turret 50 for selecting one of the lenses for printing.

Figure 11:
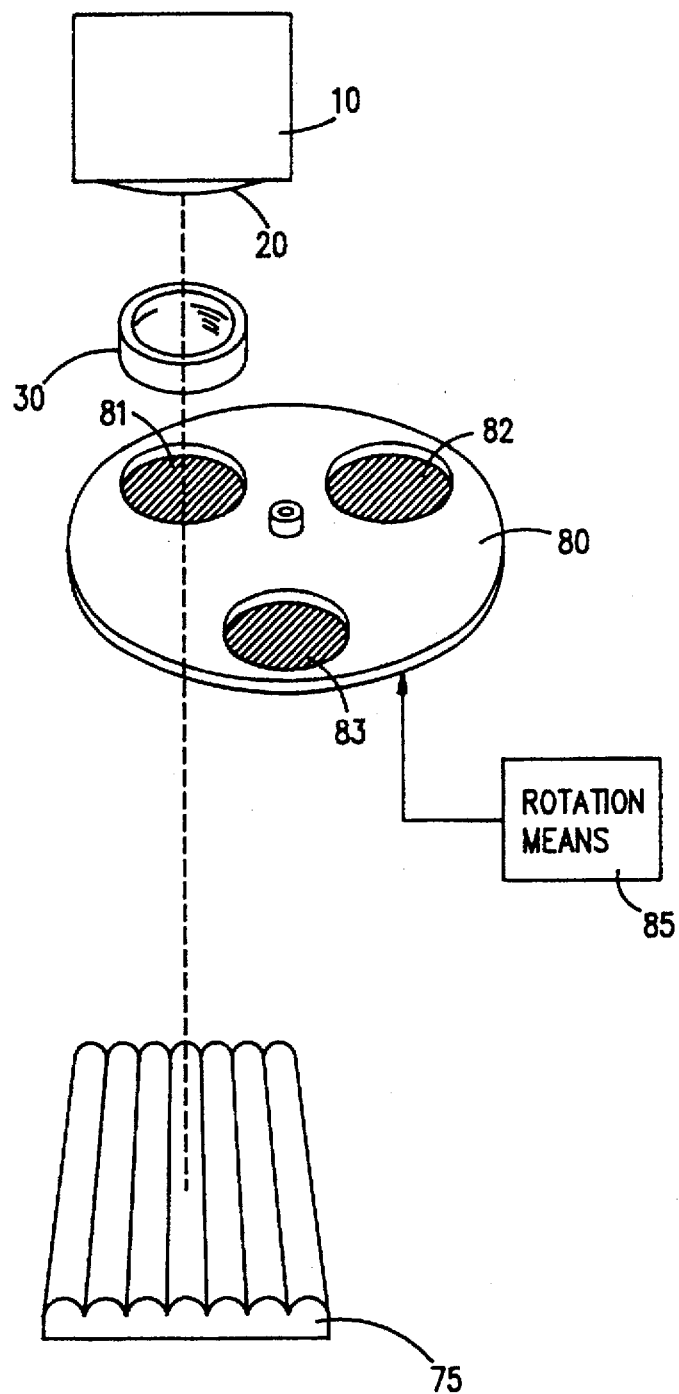
FIG. 11 illustrates the use of a plurality of color filters for filtering the projected images.

FIG. 11 illustrates the use of a plurality of color filters for filtering the projected images, according to the present invention. As shown in FIG. 11, an electronic displaying device 10 is used to display 2D images for exposure. It is preferred that each of the 2D images is separated into three primary color components such as red, green and blue (RGB) and each color component image is separately displayed on the displaying device 10 for a proper exposure time for exposure. Numeral 80 denotes a filter wheel 80 containing three color filters 81, 82, 83, matching the color of component images. The filter wheel 80 is turned by rotation means 85 so as to select a color filter to filter the image projected by projection lens 30 when a corresponding color component is displayed on the displaying device 10. The electronic displaying device 10 can be a black-and-white device or a color device. Alternatively, a common filter pack containing one or more color filters is used to filter the projected image of each color component.

Figure 12:
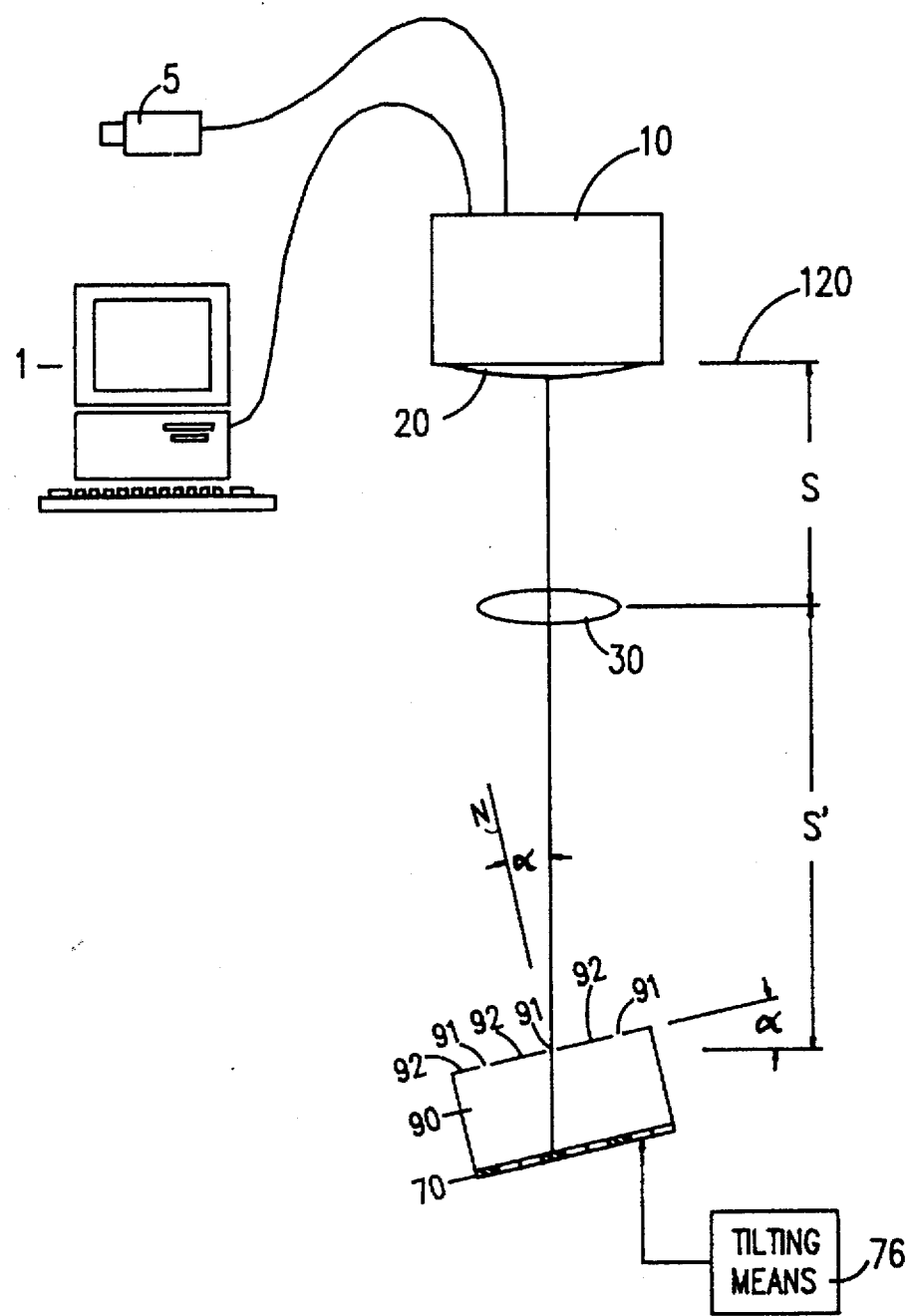
FIG. 12 illustrates the use of a parallax barrier plate as a view-separating screen in 3D printing, in lieu of a lenticular screen.

FIG. 12 illustrates the use of a parallax barrier plate as a view-separating screen in 3D printing, in lieu of a lenticular screen. Just as a lenticular screen comprises a contiguous array of linear lenticules, a parallax barrier plate 90 comprises linear blocking strips 92 and clear strips 91 alternately arranged to separate the views of a 3D or animation picture. In FIG. 12, a parallax barrier plate 90 is used in lieu of a lenticular screen 60 shown, as shown in FIG. 1. It is understood that the lenticular screen 60 in FIG. 2 –FIG. 4, and FIG. 8 –FIG. 11 can also be replaced by a parallax barrier plate.

The present invention has been described in the preferred forms and the drawing figures are for illustrative purposes only. It shall be understood by those skilled in the art that many modifications, additions and deletions can be made without departing the spirit and the scope of the invention as set forth in the appended claims.

What is claimed is:

1. A filmless method of printing 3D and animation pictures from a plurality of 2D images on a photosensitive emulsion layer secured to a view-separating screen having a longitudinal axis, said method comprising the steps of:
   a) sequentially displaying said 2D images on an electronic image displaying device;
   b) tilting said photosensitive emulsion layer together with said view-separating screen at different angles so as to achieve different projection angles; and
   c) projecting each of said displayed 2D images by a projection lens to expose said photosensitive emulsion layer through said view-separating screen at a different projection angle.

2. The method of claim 1 further comprising the step of:
   electronically warping each of said 2D images according to the tilting angle prior to displaying said 2D images in Step (a) so as to correct for the image distortion due to the tilting in Step (b).

3. The method of claim 1 further comprising the step of:
   d) tipping said electronic image displaying device so as to improve the focusing of said projection lens on said photosensitive emulsion layer.

4. The method of claim 3 further comprising the step of:
   electronically warping each of said 2D images according to the tilting angle and the tipping angle prior to displaying said 2D images in Step (a) so as to correct for the image distortion due to the tilting in Step (b) and the tipping in Step (d).

5. The method of claim 1 wherein said view-separating screen is a lenticular screen having a plurality of linear lenticules parallel to the longitudinal axis of said view-separating screen.

6. The method of claim 1 wherein said view-separating screen is a parallax barrier plate having alternate linear blocking strips and clear strips parallel to the longitudinal axis of said view-separating screen.

7. The method of claim 1 wherein the upright orientation of said 2D images displayed on said electronic image displaying device is substantially parallel to the longitudinal axis of said view-separating screen.

8. The method of claim 1 wherein the upright orientation of said 2D images displayed on said electronic image displaying device is substantially perpendicular to the longitudinal axis of said view-separating screen.

9. The method of claim 1 further comprising the step of moving said electronic displaying device and said projection lens means to different locations relative to said view-separating screen so as to change the projection angles.

10. The method of claim 1 wherein said projection lens has a large-aperture;
    wherein the light transmission path through said projection lens is controlled so as to allow each of said 2D images to be projected through a different aperture section of said projection lens in Step (c).

11. A filmless printer for printing 3D and animation pictures from a plurality of 2D images on a photosensitive emulsion layer secured to a view-separating screen having a longitudinal axis, said printer comprising:
    a) electronic imaging displaying means for sequentially displaying said 2D images;

b) means for tilting said photosensitive emulsion layer together with said view-separating screen at different angles about an axis parallel to said longitudinal axis to achieve different projection angles; and c) projection lens means for projecting each of said displayed 2D images at a different projection angle through said view-separating screen onto said photosensitive emulsion layer.

12. The printer of claim 10 further comprising:

means for electronically warping each of said 2D images prior to displaying said 2D images on said electronic image displaying means.

13. The primer of claim 10 further comprising:

means for tipping said electronic image displaying means about a second axis parallel to the longitudinal axis of said view-separating screen to improve the focusing of said projection lens means on said photosensitive emulsion layer.

14. The printer of claim 10 further comprising means for moving at least two of the three basic components including said electronic displaying means, said projection lens means and said view-separating screen to different locations to change the projection angles.

15. The printer of claim 10 further comprising means for controlling the light transmission path through said projection lens means so to allow each of said 2D images is projected through a different aperture section of said projection lens means.

16. The printer of claim 10 wherein said view-separating screen is a lenticular screen comprising linear lenticules parallel to said longitudinal axis.

17. The printer of claim 10 wherein said view-separating screen is a parallax barrier plate comprising alternate linear blocking strips and clear strips parallel to said longitudinal axis.

18. The printer of claim 10 wherein said electronic image displaying means comprises a CRT display.

19. The printer of claim 10 wherein said electronic image displaying means comprises an active-matrix display.

20. The printer of claim 10 further comprising:

means for separating each of said 2D images into a plurality of color component images to be separately displayed on said electronic image displaying means for exposure; and a plurality of matching color filters each for filtering the corresponding color component image displayed on said electronic image displaying means and projected by said projection lens means.

* * * * *